May 16, 1950  T. H. NEWBERN  2,507,807
REST FOR LEFT FOOT OF AUTOMOBILE DRIVER
Filed June 12, 1946
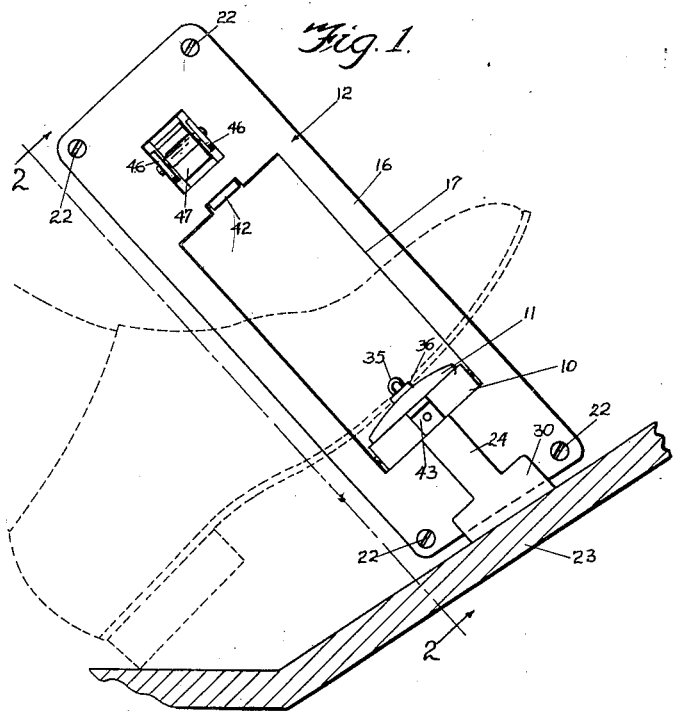
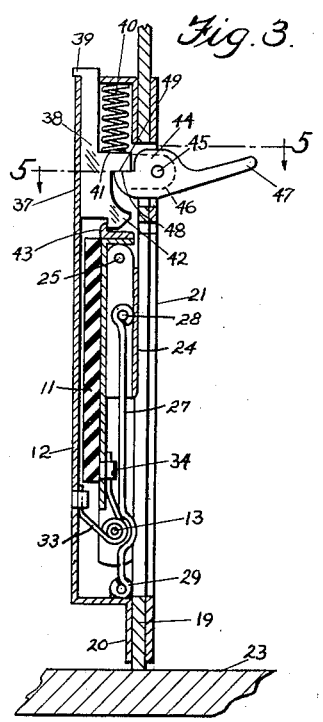
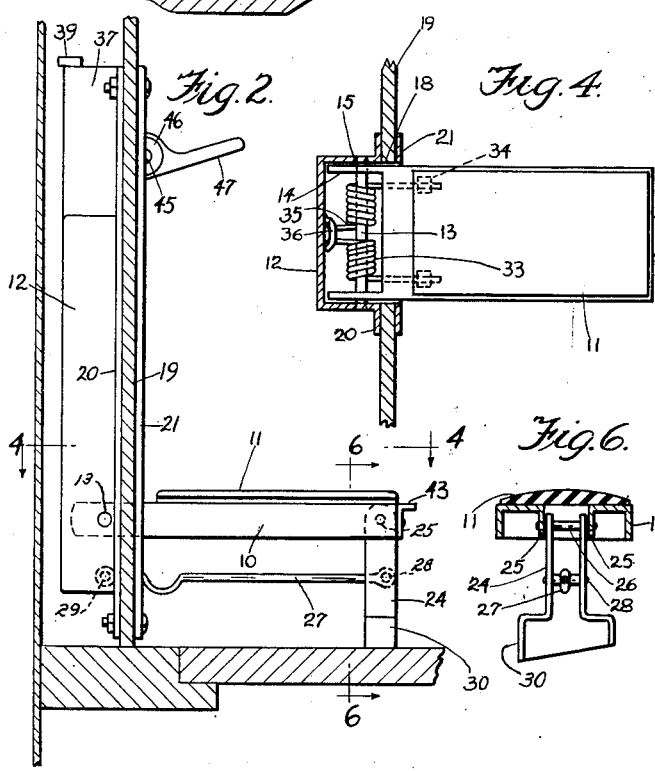
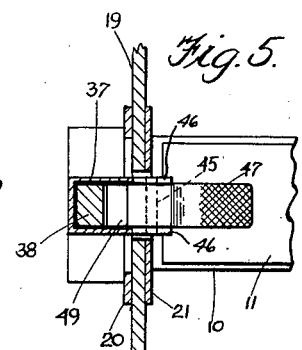
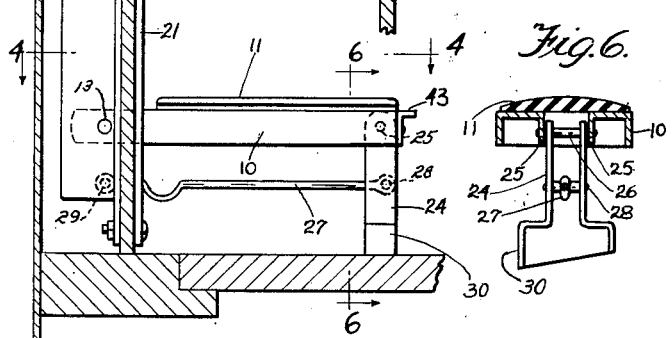
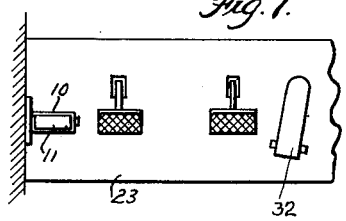
INVENTOR.
Thomas H. Newbern
BY
Victor J. Evans & Co.
ATTORNEYS Patented May 16, 1950

2,507,807

UNITED STATES PATENT OFFICE 2,507,807

REST FOR LEFT FOOT OF AUTOMOBILE DRIVER

Thomas H. Newbern, Jenkintown, Pa.

Application June 12, 1946, Serial No. 676,227

5 Claims. (Cl. 180—90.6)

1

This invention relates to a rest for the left foot of an automobile driver and has for an object to provide a foot rest adapted to fold into the left side of the automobile body when not in use and adapted, when lowered, to occupy a position parallel to the toe boards of the automobile and be of the same height and inclination as the accelerator pedal whereby both legs of the driver may occupy similar positions.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of a foot rest for the left foot of the driver, constructed in accordance with the invention, and shown in operative or lowered position.

Figure 2 is a longitudinal sectional view taken on the line 2—2 of Figure 1.

Figure 3 is a longitudinal sectional view similar to Figure 2 but showing the foot rest in folded position.

Figure 4 is a cross sectional view taken on the line 4—4 of Figure 2.

Figure 5 is a cross sectional view taken on the line 5—5 of Figure 3.

Figure 6 is a detail vertical sectional view taken on the line 6—6 of Figure 2.

Figure 7 is a diagrammatic plan view showing the location of the foot rest relatively to the clutch pedal, the brake pedal, and the accelerator pedal.

Referring now to the drawing in which like characters of reference designate similar parts in the various views, the foot rest comprises a hollow body 10, open at the bottom, see Figure 6, and having a pad 11 of yielding material on the top face to contact with the ball of the wearer's shoe. The foot rest is pivoted in a casing 12 through the medium of a shaft 13 which is engaged through apertures in hinge lugs 14 formed integral with the foot rest at one end and is journaled in bearing openings 15 in the side walls of the casing 12, see Figure 4. The front wall

2

16 of the casing is provided with a substantially rectangular opening 17 which registers with a similar opening 18 in the left side wall 19 of the motor vehicle so that the foot rest may be swung upward into the casing when not in use. The casing is provided with a flange 20 which engages one face of the wall 19 and a frame flange 21 engages the other, there being screw bolts 22 passed through both flanges and through the wall to secure the casing to the wall.

It will be pointed out that the bearing openings 15 of the foot rest are so arranged that the foot rest is pivoted to the left side of the automobile body at an angle to the horizontal, see Figure 1, so that it will, when lowered, occupy a position parallel to the toe boards 23 of the vehicle.

A hollow prop 24, open at the rear side, is pivoted to hinge lugs 25 which extend from the hollow body of the foot rest, through the medium of a pivot pin 26 passed through the sides of the prop and through the hinge lugs, see Figure 6.

The prop is moved to operative position when the foot rest is lowered, through the medium of a brace rod 27 which is pivotally connected at one end to the prop through the medium of a pivot pin 28, and is pivotally connected at the other end to a hinge lug 29 on the bottom of the casing 12, see Figures 2 and 3. When the foot rest is rocked upward into the casing the brace rod 27 collapses the prop into the hollow body of the foot rest.

The prop may be formed of strap metal and is provided at the free end with an enlarged head 30, see Figure 1, which engages the toe boards 23 so that the head coacts with the pivotal connections of the foot rest to hold the foot rest at the same height and inclination as the accelerator pedal 32 when the foot rest is in position for use so that both legs of the driver may occupy similar positions.

The foot rest is normally urged to lowered or operative position through the medium of a helical spring 33, see Figure 4, which is disposed on the shaft 15 and has the free ends engaged in eyes 34 on the hollow body of the foot rest, see Figure 3, and has the intermediate portion provided with a loop 35 which is engaged in a loop 36 which projects from the rear wall of the casing 12.

When the foot rest is not to be used it is manually swung upward into the casing and is automatically latched in this position as will now be described.

The casing 12 is provided at the top with a reduced extension 37 in which is slideably mounted a latch 38, see Figure 3, having a stop lug 39 at the upper end which projects through an opening in the top of the extension and engages over the rear wall of the extension to limit downward movement of the latch. A helical spring 40 is seated on a shoulder 41 formed on the latch and is confined between the shoulder and the top wall of the extension to hold the latch yieldably at its downward limit of movement. The latch is provided with a tooth 42 which engages over an angular keeper 43 when the foot rest is rocked into the casing and yieldably holds the foot rest in released position.

For releasing the latch 38 to permit the spring 33 to move the foot rest to lowered or operative position, a latch release 44 is pivotally mounted on a pivot pin 45 which is carried by hinge ears 46 formed on the casing 12 and is provided on one side of the pivot with a handle 47 and on the other side with a tooth 48 which lodges underneath a shoulder 49 on the latch when the latch is in operative position, shown in Figure 3. When the operator pulls down on the handle 47 the tooth 48 will push against the shoulder 49 and lift the latch 38 until the tooth 42 of the latch is free of the keeper 43 to permit the foot rest to be lowered by its controlling springs to operative position.

From the above description it is thought that the construction and operation of the invention will be fully understood without further explanation.

What is claimed is:

1. The combination with a motor vehicle having an accelerator control pedal and toe boards in the drivers compartment, of a driver's foot rest pivoted to the left side of the vehicle body at an angle to the horizontal and adapted to occupy a position parallel to the toe boards when in operative position, a prop hinged to the foot rest and collapsible against the foot rest when the foot rest is in raised released position, a rod pivotally connected to the prop and to the left side of the vehicle below the hinged end of the prop for moving the prop to operative position when the foot rest is lowered, spring means connected to the foot rest normally urging the foot rest to lowered operative position, said prop disposing the foot rest at the same height as the accelerator pedal when in operative position so that both legs of the operator may occupy similar driving positions, and means for latching the foot rest in raised released position at the left side of the vehicle.

2. The structure as of claim 1 and in which the spring means comprises a helical spring on the foot rest bearing against the bottom of the foot rest at one end and at the other end bearing against the side of the vehicle.

3. The structure as of claim 1 and in which the means for latching the foot rest in raised released position comprises an angular keeper secured to the free end of the foot rest, a casing secured to the wall of the vehicle, a vertically movable latch in the casing, a spring engaging the latch and the casing normally urging the latch downward, a tooth on the latch engageable with the keeper to hold the foot rest in raised released position, and a latch release pivoted on the casing having a tooth engageable underneath a shoulder on the latch to raise the latch and disengage the tooth from the keeper when the latch release is manually swung downward.

4. The structure as of claim 1 and in which the foot rest is provided with a pad adapted to engage the ball of the driver's shoe when the foot rest is in operative position.

5. The structure as of claim 1 and in which there is added thereto a casing recessed into the wall of the vehicle, and to which the foot rest and the brace rod are pivoted to permit the casing receiving the foot rest when the foot rest is in raised released position.

THOMAS H. NEWBERN.

REFERENCES CITED

The following references are of record in the file of this patent:

UNITED STATES PATENTS

| Number | Name | Date |
|---|---|---|
| 1,589,006 | Huddleston | June 15, 1926 |
| 2,032,157 | Dresser et al. | Feb. 25, 1936 |
| 2,167,959 | Pomernacki | Aug. 1, 1939 |
| 2,380,118 | Martz | July 10, 1945 |